Patented Aug. 5, 1930

1,772,149

UNITED STATES PATENT OFFICE

FRIEDRICH WILLIAM JOLITZ, OF WEST DULUTH, MINNESOTA

COMPOSITION OF MATTER FOR USE AS A BUILDING MATERIAL

No Drawing. Application filed June 5, 1928. Serial No. 283,140.

This invention relates to a composition of matter for use as a building material in the formation of building blocks, bricks, slabs, sidewalks, ornamental plastic work, and similar structures, one of the objects being to provide a composition of this type which is of medium weight, is an excellent non-conductor of heat and cold, is not subject to excessive expansion or contraction, is moisture-proof and sound-proof, and provides structures which can be penetrated easily and easily cut to desired sizes.

In the production of the composition the following ingredients are used in the proportions stated, namely, Grit, ¾ths of a cubic foot; crusher sand, ¾ths of a cubic foot; medium ground slag, ½ of a cubic foot; coke breeze, ½ of a cubic foot; cinder breeze, 3½ cubic feet; Portland cement in the proportions of one to six; powdered waterproofing material, 2 pounds.

The foregoing ingredients are all thoroughly mixed from one to three minutes, only enough water being used to meet the requirements. Ordinarily from ten to twelve gallons are required where the proportions above stated are employed, the entire mixture totaling seven cubic feet of batch.

In explanation of the several ingredients used it might be stated that the grit is a sharp clean washed sand. The crusher sand is made by crushing large rocks containing qualities of cement, this crusher sand being screened so as to be separated from dirt and trash. The coke breeze is obtained from coke ovens or furnaces burned to eliminate all undesirable combustible elements and divided into particles graded from fine to medium, this separation being free of foreign substances which would otherwise impair the efficiency of the ultimate product. The cinder breeze is formed of the residue obtained from burning coal. The slag is removed from the surface of molten metal, this being treated with cold water so as to be thoroughly cleaned. The waterproofing material can be a preparation known commercially as "Medusa."

After the several ingredients have been mixed to form a batch as described the same can be molded into the structures to be formed. It is preferred to cure the structures by placing them in an airtight curing room with a temperature of not less than sixty degrees F. nor more than ninety degrees F. In this room it is allowed to set for from fifty to sixty hours. The resultant structure will have great strength and will offer maximum resistance to compression. It might be stated that the cinder breeze herein referred to has cinders ranging from three-eighths inch to five-eighths inch together with finer particles.

Extensive experiments have demonstrated the fact that the basic ingredients of this composition, namely the coke breeze, cinder breeze and, more especially, the slag (preferably slag of a cream color) have certain properties of cement and, when these ingredients are mixed and packed they will adhere and form a hard structure, such as a block, capable of use in basement work. The entire composition but, more especially, a composition made up of the ingredients above mentioned, constitutes an excellent insulator.

What is claimed is:

A composition of matter for use in the formation of plastic structures consisting of the following ingredients substantially in the proportions stated, to wit, sharp clean sand, ¾ths a cubic foot; finely comminuted crushed rock, ¾ths a cubic foot; finely comminuted slag, ½ a cubic foot; crushed coke, ½ a cubic foot; crushed cinders of not more than five-eighths inch, 3½ cubic feet; powdered waterproofing material, 2 pounds; and cement mixed with said ingredients in the proportions of one part of cement to six of the balance of the mixture, said ingredients being adapted, when cured in an airtight enclosure at a temperature of from 60 to 90 degrees F., to produce a hard waterproof structure offering maximum resistance to compression.

In testimony that I claim the foregoing as my own, I have hereto affixed my signature.

FRIEDRICH WILLIAM JOLITZ.